(12) United States Patent
Dickey et al.

(10) Patent No.: US 6,965,811 B2
(45) Date of Patent: Nov. 15, 2005

(54) MEDIA DRIVE MODULE AND STORAGE LIBRARY SYSTEM

(75) Inventors: Peter Dickey, Costa Mesa, CA (US); John Maroney, Irvine, CA (US)

(73) Assignee: Quantum Corporation, San Jose, CA (US)

(*) Notice: Subject to any disclaimer, the term of this patent is extended or adjusted under 35 U.S.C. 154(b) by 116 days.

(21) Appl. No.: 10/620,056

(22) Filed: Jul. 14, 2003

(65) Prior Publication Data

US 2005/0015179 A1 Jan. 20, 2005

(51) Int. Cl.[7] ............................................. G06F 7/00
(52) U.S. Cl. ..................................... 700/213; 700/214
(58) Field of Search ............................... 700/213, 214, 700/218

(56) References Cited

U.S. PATENT DOCUMENTS

| | | | |
|---|---|---|---|
| 4,984,106 A | 1/1991 | Herger et al. | |
| 5,949,866 A * | 9/1999 | Coiera et al. | 379/211.02 |
| 6,266,574 B1 | 7/2001 | Searle et al. | |
| 6,286,078 B1 | 9/2001 | Fuld | |
| 6,370,444 B1 * | 4/2002 | Kusunoki | 700/214 |
| 6,487,474 B1 | 11/2002 | Goodman et al. | |
| 6,493,604 B1 * | 12/2002 | Kappel et al. | 700/213 |
| 6,542,787 B2 | 4/2003 | Searle et al. | |
| 6,671,580 B2 * | 12/2003 | Campbell et al. | 700/213 |
| 6,675,063 B2 * | 1/2004 | Bosley et al. | 700/218 |
| 2002/0144044 A1 | 10/2002 | Moon et al. | |

* cited by examiner

Primary Examiner—Gene O. Crawford
(74) Attorney, Agent, or Firm—Morrison & Foerster LLP

(57) ABSTRACT

In one exemplary embodiment a storage library system for storing and retrieving media devices is provided where media drives may be added modularly to the storage library. The storage library includes at least one media drive module having a frame configured to include at least one media drive, a power supply, and interface communication electronics. The drive module may further include optional data path bridge/control electronics. The storage library includes a housing having storage bins for storing storage cartridges, a mechanism for transferring storage cartridges, and an opening for receiving two or more media drive modules therein.

36 Claims, 5 Drawing Sheets

MEDIA DRIVE MODULE AND STORAGE LIBRARY SYSTEM

BACKGROUND OF THE INVENTION

1. Field of the Invention

The present invention relates generally to automated storage libraries for storing and retrieving computer data, and more particularly to systems and methods for arranging and housing media drive assemblies in automated storage libraries.

2. Description of the Related Art

A popular device for the handling and storage of large amounts of information in a data processing system includes an automated storage library system. Automated storage library systems generally decrease the access speed and increase reliability of data storage libraries containing large amounts of information. Automated storage library systems typically include a plurality of storage media devices, a transport mechanism, and one or more storage media drives in communication with a computer system for inputting and outputting desired information to and from the plurality of media devices.

Storage media devices such as cartridges housing magnetic tape with data stored thereon have proven to be an efficient and effective medium for data storage in computer systems, including automated storage libraries. Automated storage libraries including tape cartridges generally have a plurality of storage bins or slots for storing tape cartridges, a robotic retrieval/transport mechanism (often referred to as a "picker"), and one or more tape drives. The robotic picker may be controlled to select a specific storage tape cartridge from the library and transfer the tape cartridge between a storage slot and a tape drive within seconds. The robotic picker typically includes a gripper or hand mechanism positioned on the robotic picker to controllably retrieve and transport a tape cartridge within the storage library.

An automated storage cartridge library is typically interfaced to a computer system such as a computer network or the like. The storage library or interfaced computer system may index the location of the tape cartridges and their associated stored data within the storage library for later retrieval of the stored information. When desired, the storage library may be activated to retrieve a desired storage tape and load it into a drive to access the stored information and/or write new information. In large storage libraries multiple tape drives are generally employed to increase access and storage performance by operating in parallel as well as providing back-up drives in case of failure, maintenance, and the like.

Generally, the number of media drives included within an automated library system is tailored to the end user's desired capacity for data storage and/or access time. Automated storage libraries are often manufactured, however, with the infrastructure or hardware, including power supplies, cabling, interface communication electronics, etc. to support a full complement or maximum number of tape drives within the library housing. For example, the library may include the electrical power and interface electronics to support up to 12 tape drives even though a significant number of users might desire less than the full complement of tape drives, for example, only four tape drives.

Storage libraries are generally manufactured with the hardware and infrastructure to support the maximum number of tape drives to reduce overall manufacturing costs despite the varying number of possible tape drives that may be included in a storage library system. Additionally, future field upgrades of the storage library to include additional drives is made easier with the hardware and infrastructures already included in the system. This practice, however, raises the overall cost and complexity of the library system for those users who use or desire less than the maximum number of tape drives because the unused infrastructure and hardware to support additional drives is not fully realized.

Alternatively, each storage library system may be custom manufactured with the infrastructure and hardware to fit varying numbers of media drives. Custom manufacturing, however, increases the average cost and time of manufacturing storage library systems. Additionally, field upgrades of a storage library system may be more difficult and costly because additional infrastructure, hardware, and testing may be necessary for the system to support additional drives.

Therefore, what is needed is an automated storage library system and method for incrementally including a number of tape drives efficiently within a storage library system housing. For example, reducing the amount of unused infrastructure within the library system when less than the maximum number of drives are used is desired. It is also desired that additional drives may be added to the storage library system in the field efficiently and with sufficient power, cabling, interface communication electronics, etc. to support the additional drives.

BRIEF SUMMARY OF THE INVENTION

In one exemplary embodiment a storage library system for storing and retrieving media devices is provided where media drives may be added modularly to the storage library. The storage library includes at least one media drive module having a frame configured to include at least one media drive, a power supply, and interface communication electronics. The storage library includes a housing having storage bins for storing storage devices, a mechanism for transferring storage devices, and an opening for receiving two or more media drive modules therein.

In another exemplary embodiment a device for modularly adding one or more media drives to a storage library is provided. The device includes a modular frame configured to include one or more media drives, a power supply, and interface communication electronics. The modular frame may include at least one slot for receiving the one or more media drives and a slot for receiving interface electronics to communicate with the storage library. The modular frame may further include an optional slot for receiving interface electronics that may be used for data path bridging/control between media drives and a storage area network (SAN) that adapts various high speed data communications.

In another exemplary embodiment a method for modularly adding media drives to an automated storage library is described. The method includes modularly adding a number of media drives, a power supply, and interface communication electronics to a storage library housing. The number of drives is less than the total number of drives that may be included in the storage library and the power supply and interface communication electronics are sufficient to support the number of drives.

The present invention and its various embodiments are better understood upon consideration of the detailed description below in conjunction with the accompanying drawings and claims.

DETAILED DESCRIPTION OF THE INVENTION

Figure 1:
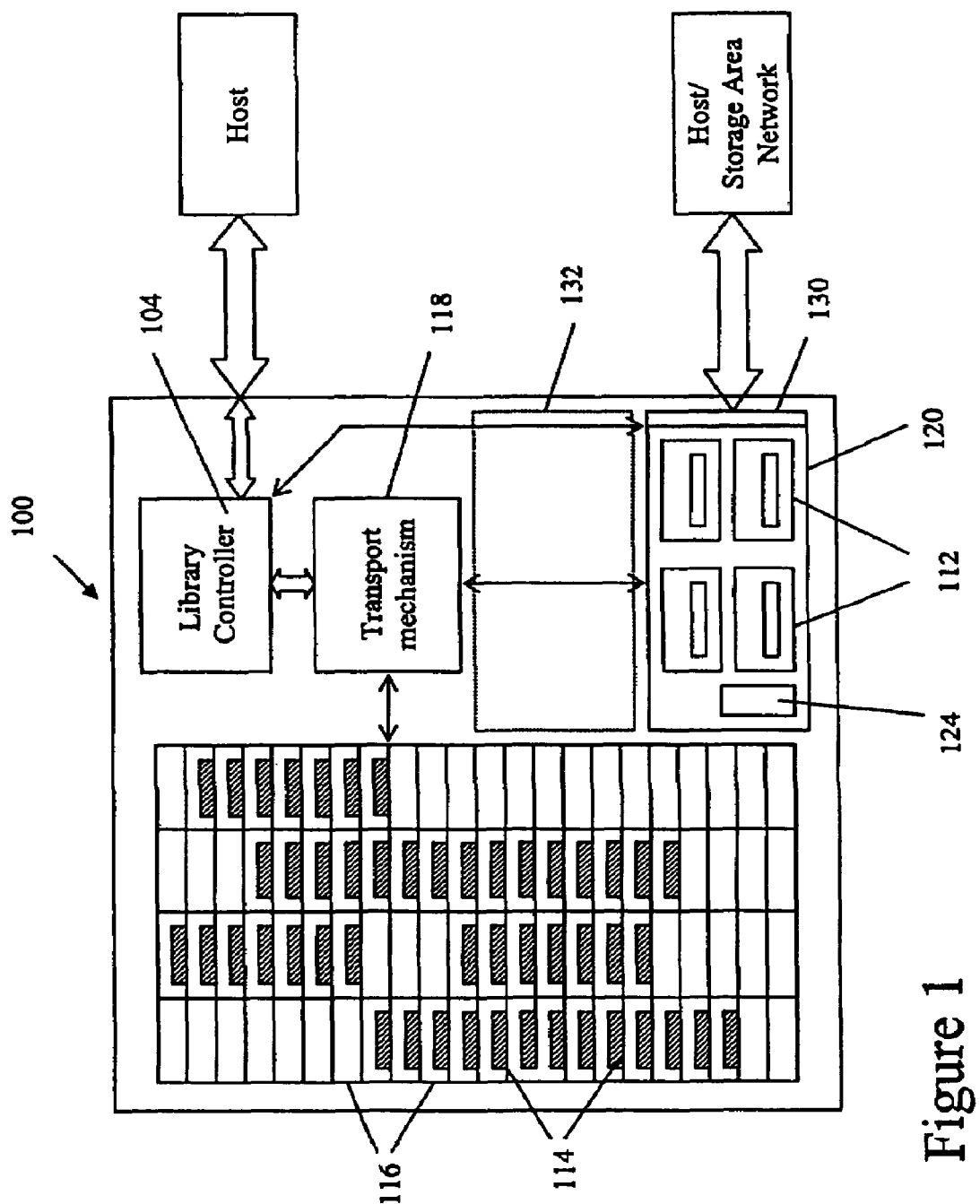
FIG. 1 illustrates a block diagram of an exemplary automated storage library system in communication with a host processor.

The following description is presented to enable any person skilled in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

Automated storage libraries are generally sold with a number of media drives installed that is fewer than the total number the library is capable of supporting. When manufactured, however, the capability or infrastructure to support a full complement of drives is generally built into the library and tested. Providing the added infrastructure including power supplies and cabling to support the maximum number of drives increases the overall cost of the library, which may not be fully recovered from the end user because the full capability may never be used. An exemplary storage library system for storing storage media devices described herein includes separate media drive modules for housing an incremental number of drives and the infrastructure for the operation of the drives clustered in a single modular structure or frame. In this manner, the manufacturing cost and infrastructure in a storage library system for a desired number of drives may be more closely approximated to the number of drives actually included in the storage library system. Furthermore, additional drives may be more easily added to the library system in the field.

In one example, a storage library includes a housing having a plurality of storage bins for housing storage cartridges and a robotic transporter/retriever mechanism for transporting storage cartridges between the storage bins and one or more media drives. The library housing includes an opening or slot wherein a plurality of drive modules may be received. A drive module may include a frame configured to support one or more media drives, a power supply, and interface communication electronics to support the one or more media drives. In one example, the drive module includes a number of drives less than the maximum number of drives that may be included in the library housing. The infrastructure to support the number of drives may be tailored to the number of drives included in the drive module, thereby reducing the unused infrastructure when less than the maximum number of drives are included.

The examples described herein are generally described with reference to a magnetic tape library system including multiple magnetic tape cartridges and magnetic tape drives. It should be understood, however, that the various examples are contemplated for use with other types of storage media devices and storage media drives. For example, a storage library may include magnetic disks, optical media devices, and the like alone or in combination with other media storage devices and corresponding media drives.

FIG. 1 is a schematic illustration of an exemplary automated storage library system 100 for the storage and retrieval of a plurality of storage cartridges 114 stored therein. Library system 100 includes at least one drive module 120 including one or more tape drives 112, a plurality of tapes or cartridges 114 stored in bins or storage slots 116, and a transport mechanism 118 that may be equipped with a picker mechanism or the like (not shown) for transporting a selected cartridge 114, for example, between a drive 112 and a storage slot 116. A library controller 104 communicates with a host processor or computer network to control the actions of transport mechanism 118 and drives 112 to retrieve and/or store data.

The one or more drives 112 included within module 120 may include, for example, magnetic tape drives, optical disk drives, and the like. Accordingly, storage cartridges 114 may include, for example, various magnetic or optical storage media. Module 120 further includes infrastructure to support drives 112 within module 120. In this example, module 120 includes power supply 124 and interface communications board 130. Power supply 124 provides power to drives 112 and interface communications board 130. Interface communications board 130 includes electronics to facilitate communication between drives 112 and controller 104.

Storage library 100 may further include an opening or space for receiving at least a second module at location 132. Similar to module 120, an additional module at location 132 may include a power supply and interface communication electronics to support additional media drives. This frees storage library 100 from including additional infrastructure for supporting additional drives while allowing for relatively easy field upgrades because an additional module, similar to module 120, may include the additional power and communication electronics necessary for the operation of additional drives. Further, an additional module including the power, media drive, and communication electronics may be tested more easily prior to installation in the storage library system.

During operation of automated tape library system 100, transport mechanism 118 transports tape cartridges 114 between storage slots 116 and tape drives 112 for read and/or write operations. Library controller 104 generally controls and coordinates movements and actions of the drives 112, transport mechanism 118, and the like. Library controller 104 may include a suitable computer processor or microprocessor and is typically interconnected with a host processor or computer network that sends access commands to controller 104. Initially, an inventory of the cartridges 114 may be performed such that library system 100 may identify and catalogue the contents of cartridges 114 stored within library system 100. To perform an inventory, the library system 100 might include a barcode sensor or other identification means associated with transport mechanism 118 that identifies a barcode label or the like associated with cartridges 114. In this manner, a specific cartridge 114 may be retrieved and transported to drive 112 where information to be recorded to or read from cartridge 114 is transmitted between one of drives 112 and the host processor through controller 104.

Automated storage library system 100 may further include various other features such as a load port for manually adding and removing cartridges to and from the library, various access doors, control panels, cooling fans, and the like as are known by those skilled in the art. For illustrative purposes, however, such additional features have been omitted from the figures.

Figure 2:
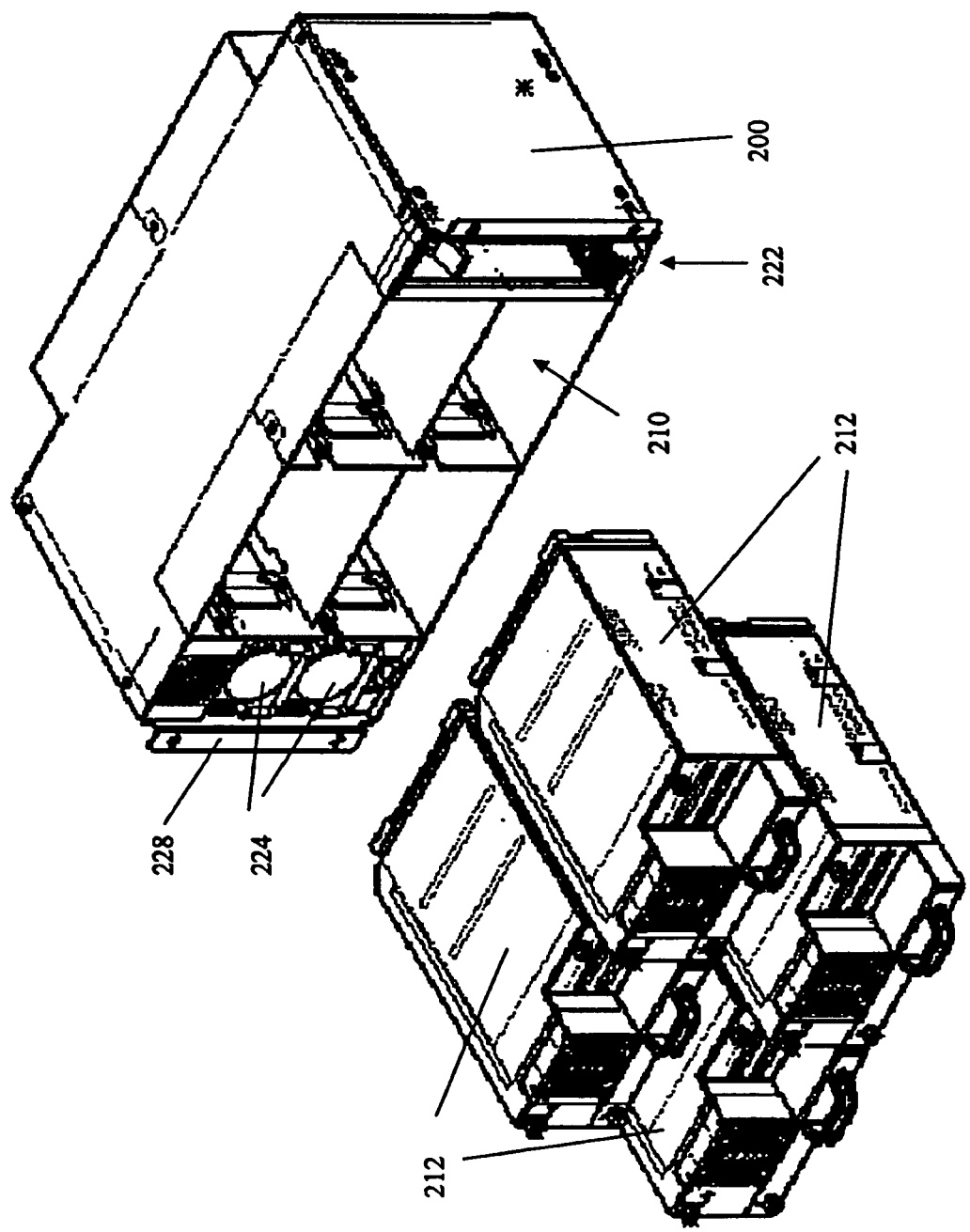
FIG. 2 illustrates an exemplary media drive module.

FIG. 2 illustrates an exemplary media drive cluster or drive module 200 and media drives 212. In this example, media drive module 200 includes a structure or frame having slots 210 wherein one or more tape drives 212 may be disposed. In this example, each drive 212 is enclosed in a housing to enable more secure mating between drives 212 and slots 210 of module 200. For example, the housing may include guides, rails, engaging elements, and the like such that media drives 212 are securely contained within the housing of module 200. Media drives 212 may also be removable from module 200 or the housing for maintenance, replacement, and the like. In other examples, module 200 and slots 210 may be constructed to securely mate directly with tape drives 212 absent additional housing.

Module 200 includes one or more slots 222 for interface communication electronics, e.g., a card or board, and one or more power supplies 224. When media drives 212 are within the housing of module 200 drives 212 may be coupled to power supply 224 and a communications board located in interface communications board slot 222. Interface communications board slot 222 may receive interface communications electronics, for example, a card or board, to support the drives by communicating with the library controller and/or host processor as shown in FIG. 1. The communications board may communicate with the library controller in any suitable manner such as small computer system interface (SCSI), ultra-wide SCSI, fast SCSI, fibre channel, intelligent drive electronics (IDE), enhanced IDE (EIDE), and the like. Additionally, an optional slot for receiving interface electronics used for data path bridging/control between media drives and the host or storage area network (SAN) that adapts to various high speed data communications may be included.

Further, module 200 includes one or more power supplies 224 to provide power to media drives 212 and interface communication electronics included within module 200. Module 200 may include one or more power supplies 224 depending on the particular application. It should be recognized that module 200 may include more power supplies 224 and interface communication electronics than the minimum necessary for operation to provide redundancy in case of failure, maintenance, and the like.

Drive module 200 may be added to a library system modularly as desired. For example, in a library system where four or fewer tape drives are desired a single module 200 may be included if between one and four drives are desired, and if more than four tape drives are desired, two or more modules 200 may be included. Further, module 200 may be easily added to upgrade the library in the field because module 200 includes the necessary cabling, power supply, interface communication electronics and the like to be easily added to the storage library system, and may be more easily tested prior to installation within a library system.

Figure 3:
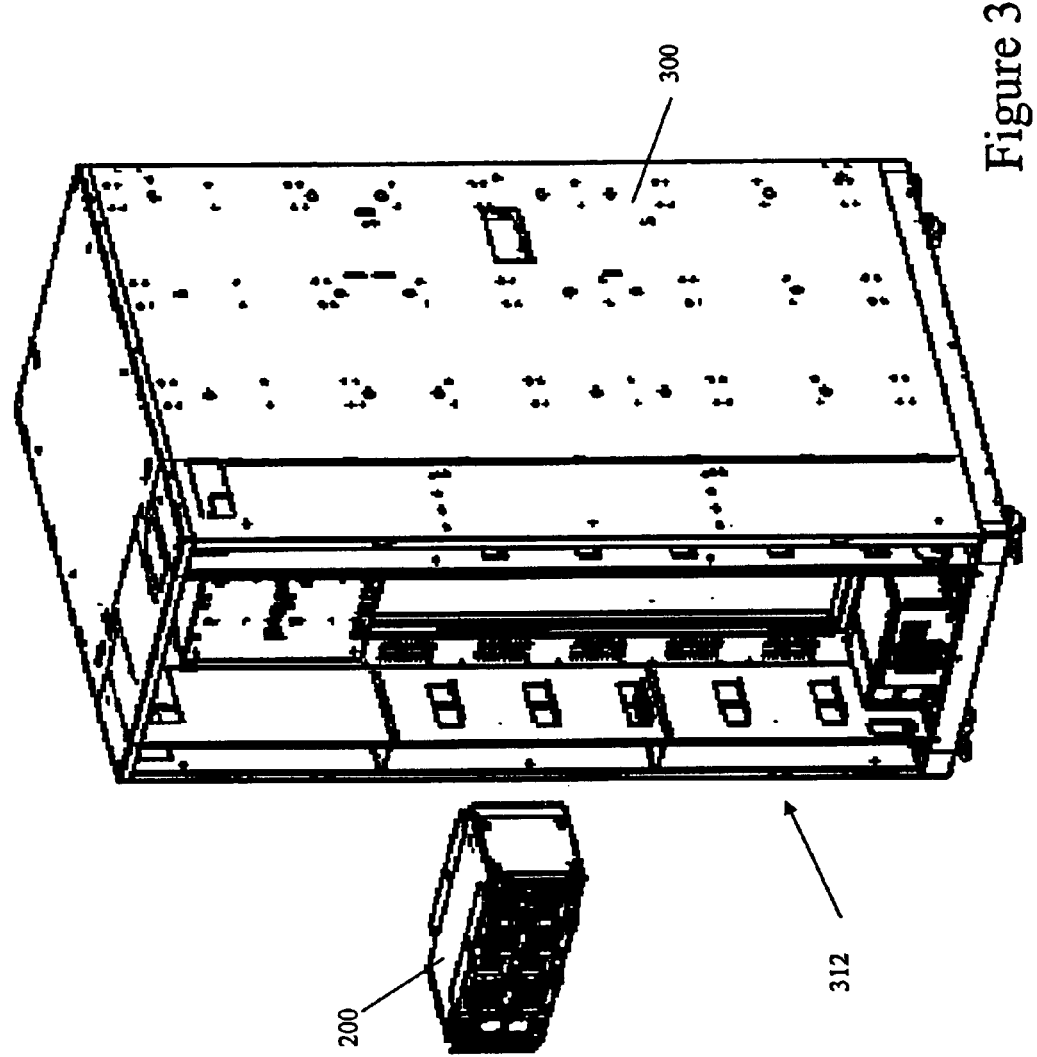
FIG. 3 illustrates an exemplary media drive module adjacent a storage library cabinet.

FIG. 3 illustrates drive module 200 adjacent an exemplary library cabinet 300. In one example, the library cabinet 300 includes an open architecture on one side to facilitate the addition of one or more modules 200. As illustrated, an opening 312 runs vertically along a portion of the cabinet 300. The library cabinet 300 does not need to include shelves, power supplies, or interface communication electronics to support a plurality of drives. Each module 200 preferably includes a sufficient number of power supplies and interface communication electronics for the media drives included therein. Thus, as drives are needed or desired for library cabinet 300, additional modules 200 may be installed in cabinet 300 without providing cabling, power supplies, interface communication electronics, etc., for a fill complement of media drives.

It should be recognized that although FIG. 3 depicts an opening to add modules 200 on one side of cabinet 300, wherein modules may be added adjacent to or congruently with other modules 200, other architectures are possible and contemplated. For example, two or more sides of cabinet 300 may include openings, or multiple openings may be included on a single side of cabinet 300. Further, other shaped cabinets are possible, for example, a curved or silo shaped cabinet might be used with various openings or slots for receiving one or more drive modules.

Module 200 may be installed or secured in cabinet 300 in any suitable manner. For example, module 200 may installed by securing flange 228 (see FIG. 2) to cabinet 300. Power supplies 224 and interface communication electronics within communication slot 222 may be appropriately connected to the library system. Preferably, cabinet 300 does not include shelves, electrical power, cabling, and the like to support the additional drives. In this manner the cost of manufacturing a library storage system and cabinet may be reduced because the library does not have the burden of providing additional infrastructure in terms of power and cabling to support the maximum number of drives. Additional drives and infrastructure may be modularly included depending on the particular system through additional modules 200 at the time of manufacturing or in the field based on changing customer requirements.

The size and design of the library storage system and, more particularly, the cabinet for housing storage media and media drives may vary greatly. Accordingly, the size and design of a media drive module may vary. For example, the module may include a single column or row of drives or a single tape drive, power supply, and communications board slot. The drives may be oriented differently, e.g., angled, depending on their location within the library system. In one example, the storage media devices or transport mechanism may be oriented to facilitate a certain design goal that may then drive or influence the orientation of the media drives in the library storage system.

Figure 4A:
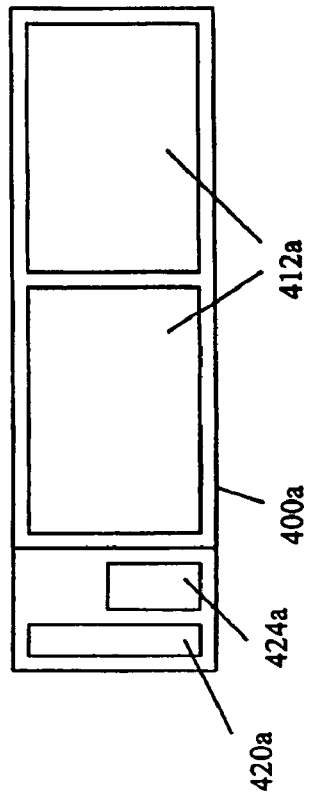
FIGS. 4A–4D illustrate various exemplary media drive module configurations.

FIGS. 4A–4D illustrate various exemplary configurations of modular frames or structures including one or more media drives, a power supply, and interface communication electronics. For example, FIG. 4A illustrates an exemplary module 400a including two drives 412a configured horizontally. Further, power supply 424a and interface communications board slot 420a are provided within module 400. Module 400a may be disposed in a storage library system horizontally or vertically.

Figure 4B:
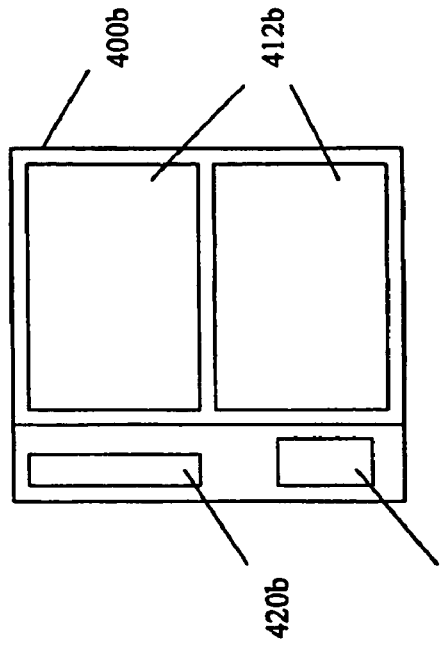

FIG. 4B illustrates another exemplary configuration of a module 400b including two drives 412b configured vertically. Module 400b further includes power supply 424b and interface communications board slot 420b located horizontally adjacent the vertically stacked drives 412b.

Figure 4C:
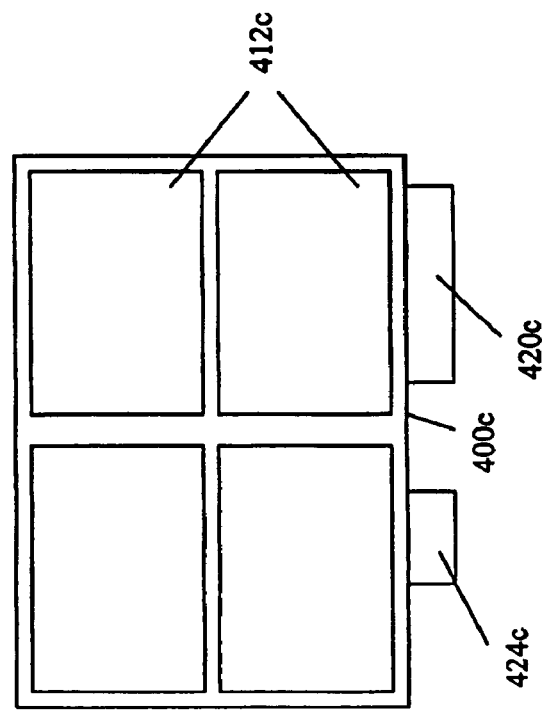

FIG. 4C illustrates another exemplary configuration of a module 400c including four drives 412c. Module 400c is similar to that of FIG. 2, except that power supply 424c and interface communications board 420c are located externally to the housing of module 400c. Specifically, power supply 424c and interface communications board slot 420c are attached adjacent to the modular frame of module 400c.

Figure 4D:
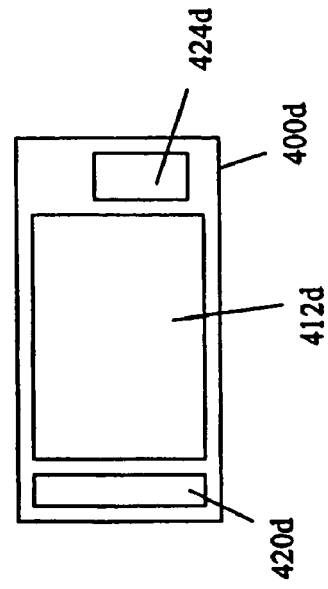

FIG. 4D illustrates another exemplary configuration of a module 400d including a single drive 412d, power supply 424d, and interface communication electronics 420d. In this example, a single drive 412d may be added to a library system including power supply 424d and interface communication electronics 420d.

Figure 5:
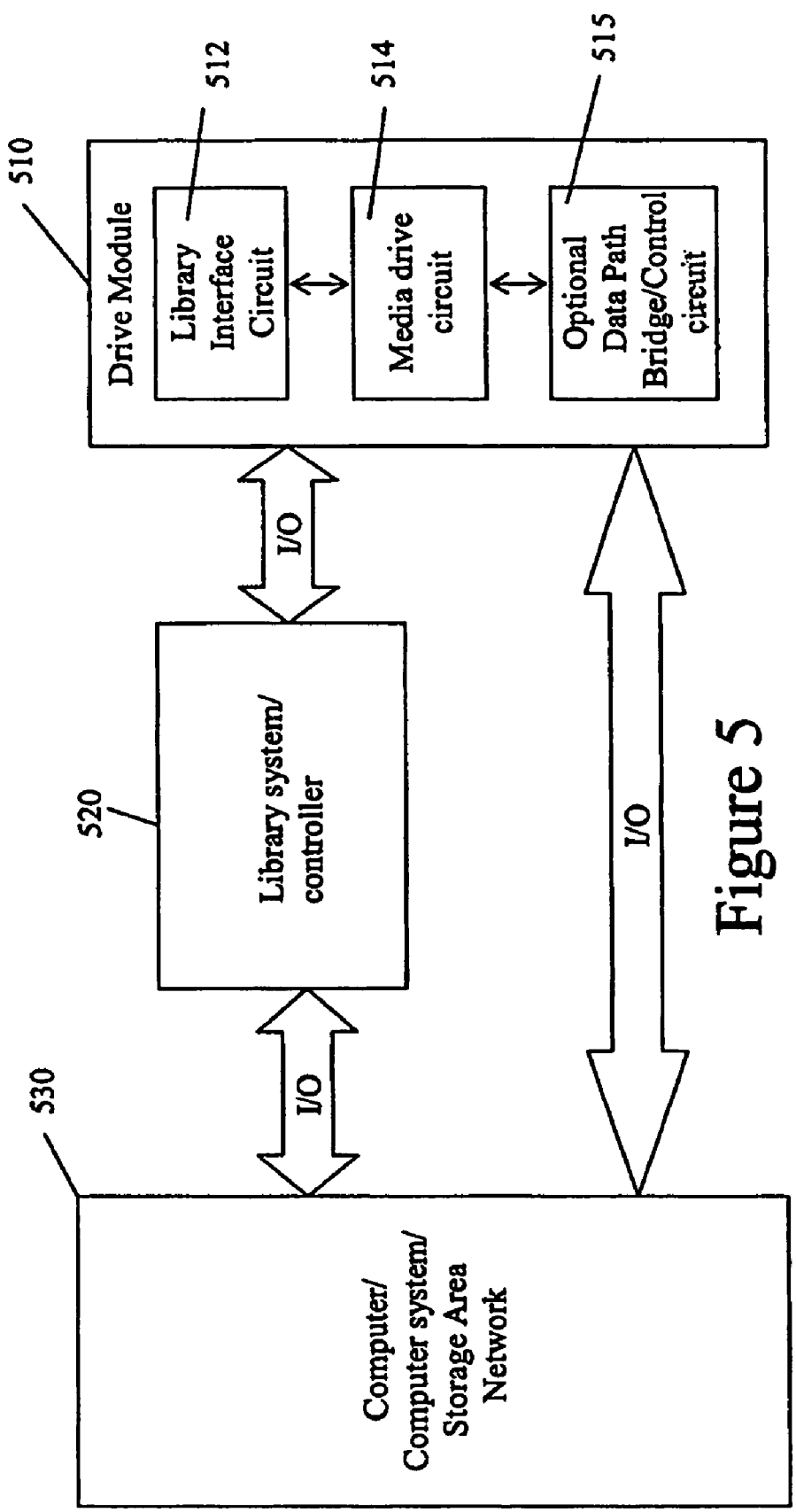
FIG. 5 illustrates a schematic block diagram of exemplary circuitry of a media drive module and storage library.

FIG. 5 illustrates a schematic block diagram of exemplary circuitry of a media drive module and library storage system. A library interface circuit 512 for interfacing and communicating between drive module 510 and library system controller 520 is included within drive module 510. Specifically, library interface circuit 512 controls a media drive circuit 514 of one or more drives included in drive module 510 based, at least in part, on communications with library system controller 520. Library system controller 520 in turn communicates with a host computer or computer system 530 located externally to the library system. Power may be supplied to the drive module including the library interface circuit 512 and media drive circuit 514 from one or more power supplies included within drive module 510. Drive module 510 may further include a data path bridging/control circuit 515 for communication between media drives and the host/storage area network (SAN) that adapts various high speed data communications known in the art. This provides a virtual communication interface that abstracts/enhances the abilities of the drive. This also allows the library controller management control over the data path to the drives.

The above detailed description is provided to illustrate exemplary embodiments and is not intended to be limiting. It will be apparent to those skilled in the art that numerous modification and variations within the scope of the present invention are possible. For example, various configurations of media drives, power supplies, interface communication electronics, and the like may be included in a drive module. Further, numerous other media devices and storage library configurations not explicitly described herein may be used within the scope of the exemplary methods and structures described as will be recognized by those skilled in the art. Accordingly, the present invention is defined by the appended claims and should not be limited by the description herein.

What is claimed is:

1. A storage library for storing storage devices, comprising:
    a media drive module having a frame configured to support a media drive, a power supply, and interface communication electronics; and
    a library housing having:
        storage bins for storing storage devices,
        a mechanism for transferring storage devices, and
        an opening for receiving two or more media drive modules.

2. The storage library of claim 1, wherein the frame includes one or more slots for receiving a media drive.

3. The storage library of claim 1, wherein the media drive module is configured to include four media drives.

4. The storage library of claim 1, wherein the media drive module is configured to include two media drives.

5. The storage library of claim 1, wherein the media drive module is configured to include one media drive.

6. The storage library of claim 1, wherein the media drive module includes a media drive operable to receive and release a storage device.

7. The storage library of claim 1, wherein the storage devices include magnetic tape cartridges.

8. The storage library of claim 1, wherein the media drive includes a magnetic tape drive.

9. The storage library of claim 1, wherein the media drive module includes one or more power supplies to support the maximum number of media drives that the media drive module may include.

10. The storage library of claim 1, wherein the media drive module includes interface communication electronics configured to communicate with a library controller.

11. The storage library of claim 1, wherein the media drive module includes data path bridge/control electronics.

12. The storage library of claim 1, wherein the library housing includes an open architecture for receiving the media drive module.

13. The storage library of claim 1, wherein the media drive module does not include a mechanism for transferring storage devices.

14. A device for modularly adding one or more media drives in a storage library, comprising:
    a frame configured to include one or more media drives, a power supply, and interface communication electronics, wherein
        the frame includes at least one slot for receiving the one or more media drives, and
        the frame is adapted for modular insertion within a storage library.

15. The device of claim 14, wherein the frame is further configured to include optional data path bridge/control electronics.

16. The device of claim 14, wherein the frame is configured to include two media drives.

17. The device of claim 14, wherein the frame is configured to include four media drives.

18. The device of claim 14, wherein the frame is configured to include one media drive.

19. The device of claim 14, wherein the one or more media drives are operable to receive and release storage devices.

20. The device of claim 14, wherein the storage devices include magnetic tape cartridges.

21. The device of claim 14, wherein the one or more media drives includes a magnetic tape drive.

22. The device of claim 14, wherein the frame includes one or more power supplies to support the maximum number of media drives that the frame may include.

23. The device of claim 14, wherein the interface communication electronics are configured to be in communication with a library controller.

24. The device of claim 14, wherein the frame further includes one or more slots for receiving the interface communication electronics.

25. The device of claim 14, wherein the frame does not include a mechanism for transferring storage devices.

26. A method for including media drives in a storage library, comprising:
    modularly adding a frame to a storage library housing, the frame configured to include a number of media drives, a power supply, and interface communications electronics, wherein
        the frame includes at least one slot for receiving the number of drives, and
        the power supply and the interface communication electronics are sufficient to support the number of drives.

27. The method of claim 26, wherein the number of media drives is 4.

28. The method of claim 26, wherein the number of media drives is 2.

29. The method of claim 26, wherein the number of media drives is 1.

30. The method of claim 26, wherein the media drives include magnetic tape drives.

31. The method of claim 26, wherein the frame is configured to be added to an opening of a storage library system housing.

32. The method of claim 26, wherein the frame is removable from the storage library housing.

33. The method of claim 26, further including testing the operation of at least one of the media drives, the power supply, and the interface communication electronics when associated with the frame and before modularly adding the frame to the storage library housing.

34. A method for including media drives in a storage library, comprising:

modularly adding a frame to a storage library housing, the frame including a number of media drives, a power supply, and interface communications electronics, wherein the power supply and the interface communication electronics are sufficient to support the number of drives; and testing the operation of one or more of the media drives, the power supply, and the interface communication electronics when included with the frame and prior to modularly adding the frame to the storage library housing.

35. A device for modularly adding one or more media drives to a storage library, comprising:

a frame including one or more media drives, a power supply, and interface communication electronics, wherein the frame is adapted for modular addition to a storage library, and the one or more media drives are powered by the power supply and function through the interface communication electronics remotely from the storage library.

36. The device of claim 35, wherein the one or media drive are adapted to be tested through the interface communication electronics remotely from the storage library.

* * * * *